United States Patent [19]

Flournoy

[11] Patent Number: 5,399,001
[45] Date of Patent: Mar. 21, 1995

[54] VEHICLE ALL-WEATHER BRAKING AID

[76] Inventor: Lee C. Flournoy, Three E. Woodward Blvd., Tulsa, Okla. 74114

[21] Appl. No.: 156,418

[22] Filed: Nov. 22, 1993

Related U.S. Application Data

[63] Continuation-in-part of Ser. No. 861,607, Apr. 1, 1992, abandoned.

[51] Int. Cl.⁶ ............................................. B60T 13/06
[52] U.S. Cl. ...................................... 303/24.1; 303/7; 303/118.1
[58] Field of Search ................. 303/9.67, 9.68, 20, 303/24.1, 118.1, 7, 13, 17, 20, 25, 28, 35, 40, 57, 61; 188/3 H

[56] References Cited

U.S. PATENT DOCUMENTS

| | | | |
|---|---|---|---|
| 3,908,782 | 9/1975 | Lang et al. | 303/20 X |
| 3,909,075 | 9/1975 | Pittet, Jr. et al. | 303/24.1 |
| 3,967,863 | 7/1976 | Tomecek et al. | 303/20 X |
| 4,030,756 | 6/1977 | Eden | 303/9.68 |
| 4,035,034 | 7/1977 | Sekiguchi | 303/118.1 |
| 4,538,859 | 9/1985 | Russell | 303/24.1 |
| 4,616,881 | 10/1986 | Müller et al. | 303/7 |
| 4,726,627 | 2/1988 | Frait et al. | 303/20 X |
| 4,749,238 | 6/1988 | Singleton et al. | 303/7 X |
| 5,002,343 | 3/1991 | Brearley et al. | 303/7 |

FOREIGN PATENT DOCUMENTS 75258 5/1976 Australia ............................ 303/24.1

OTHER PUBLICATIONS

Tom Kennedy, "ABS Moves Ahead On All Fronts" (Jan./Feb. 1992).
Truck Guide vol. III, Chapter 15, "Air Brakes" pp. 757–890, Pre Nov. 22, 1993.
Ian S. Jones, "Truck Air Brakes—Current Standards & Performance", Oct. 1984.
Southern Motor Cargo (Aug. 1985) "Ford Fields Setback, Options" p. 36, Aug. 1985.

Primary Examiner—Robert J. Oberleitner
Assistant Examiner—Alfred Muratori
Attorney, Agent, or Firm—Head & Johnson

[57] ABSTRACT

An all-weather braking aid for a vehicle having brakes actuated by air pressure. The all-weather braking aid includes at least one motion detector responsive to inertia of the vehicle. A sensor is operatively engaged with the motion detector and a switch is activated by the sensor. The pressurized air is directed to a valve, the valve is normally in an open position to allow flow of the air pressure and movable to a closed position to interrupt the air pressure. The timer is engaged with the switch in order to close the valve for one selected duration and then open the valve for another selected duration, thereby providing controlled intermittent braking.

19 Claims, 6 Drawing Sheets

VEHICLE ALL-WEATHER BRAKING AID

This application is a continuation-in-part of application Ser. No. 07/861,607, filed Apr. 1, 1992, now abandoned.

BACKGROUND OF THE INVENTION

1. Field of the Invention

The present invention relates to an all-weather braking aid for a vehicle having air pressure brakes. In particular, the present invention relates to an all-weather braking aid for air pressure brakes providing controlled intermittent braking to avoid brake lock-up and overheating.

2. Prior Art

Brake problems on vehicles may be caused by a number of factors. During wet or other difficult road conditions, brakes may lock with the result that the vehicle goes out of control. Brake problems may also arise from overheating of the brakes when used in long declines.

It is possible to a certain extent for a driver to learn the skill of alternately applying and releasing the brakes to avoid locking the wheels and causing a skid. Also, in a panic situation, the driver's normal reaction is to apply full pressure, causing lock-up, skidding and possible jack-knifing.

Anti-lock all-weather braking aids have been proposed in the past. Some of the systems are operational by monitoring the turning of the individual wheels and feedback loop circuitry to predict impending wheel lock-up.

Russell (U.S. Pat. No. 4,538,859) discloses a system which is activated by both the driver and the inertia of the vehicle. When the brake pedal is depressed past half-way, the system is inoperative. This system becomes inoperative when hard braking, or panic stop, are required, making the system go into conventional braking, due to brake pressure applied to the brake pedal which activates the plunger to disable the pulsating on and off switch, which is controlled by foot brake air pressure. This causes conventional braking to be in effect, when the anti-lock action is badly needed.

Other A.B.S.'s (Anti-Lock Brake Systems) presently on the market monitor individual wheel speeds through wheel speed sensors monitored by an on-board computer. In operation, if any wheel(s) is/are slowing rapidly, indicating impending lock-up, air pressure to that/those brake actuator chamber(s) is "dumped" or vented to atmosphere. This allows several undesirable things to happen: (1) the wheels that are still being braked will, in turn, approach lock-up, and air pressure will be dumped from those chambers, sequentially; (2) this "hunting" action repeats, rapidly, causing alternating wheels to rapidly roll free, then brake. The driver has no control over wheels.

A need remains for a reliable vehicle all-weather braking aid which will provide intermittent controlled braking for air pressure brakes to avoid wheel locking and skidding and to avoid overheating of the vehicles brakes.

Accordingly, it is a principal object and purpose of the present invention to provide a vehicle all-weather braking aid for air pressure brakes which will provide controlled intermittent braking activated by the inertia of the vehicle.

It is a further object and purpose of the present invention to provide a vehicle all-weather braking aid that can easily and inexpensively be added to existing air pressure brake systems.

It is an additional object and purpose of the present invention to provide a vehicle all-weather braking aid that is responsive to both forward and lateral inertia of the vehicle.

It is a further object and purpose of the present invention to provide a vehicle all-weather braking aid for air pressure brake systems that will reduce tire and mechanical brake assembly wear.

It is a further object and purpose of the present invention to provide a vehicle all-weather braking aid which will use less air and will maintain an increased volume of air to provide additional reserve supply of air, and in consuming less air, the vehicle's air compressor will not work as hard, thereby reducing wear and maintenance. This is extremely important on long steep downgrades that require excessive air usage.

Still further it is an object and purpose of the present invention to provide a vehicle all-weather braking aid for air pressure brakes that will provide improved front steering wheel braking without any lock-up or skidding or loss of steering control, during normal braking and in emergency or panic stops, on dry or wet roads.

It is an additional object and purpose of the present invention to provide a vehicle all-weather braking aid for air pressure brake systems that will provide improved rear wheel braking without any lock-up or skidding, during normal braking and in emergency or panic stops, on dry or wet roads.

It is a further object and purpose of the present invention to provide a vehicle all-weather braking aid for air pressure brakes that will provide improved air volume and pressure management of the vehicle's air capacity, i.e., the vehicle stopping effort will be improved while, at the same time, less application air pressure will be required, thus saving the vehicle's air supply, and allowing the vehicle to descend longer down-grades without loss of adequate air pressure supply volume.

It is an additional object and purpose of the present invention to provide a vehicle all-weather braking aid for air pressure brake systems that will provide improved braking at a reduced application air pressure, so that the driver can effectively slow and stop the vehicle with less foot pressure on the brake pedal valve than is possible without the aid. Vehicle air supply usage is thereby reduced.

It is a further object and purpose of the present invention to provide a vehicle all-weather braking aid for air pressure brakes that, by pulsing the brakes, will accomplish less wear of the brakes linings and brake drums while improving the stopping power of the vehicle, thereby reducing operating costs.

It is an additional object and purpose of the present invention to provide a vehicle all-weather braking aid for air pressure brakes that will improve stopping power while at the same time reducing heat build-up of the brake linings and brake drums, thereby reducing brake fade and brake glazing, both detrimental to safe operation of the vehicle.

It is an additional object and purpose of the present invention to provide a vehicle all-weather braking aid for air pressure brakes that is activated by either forward or lateral inertia of the vehicle in the normal mode and may optionally be manually activated by a secondary switch mechanism for hazardous road conditions.

It is an additional object and purpose of the present invention to provide a vehicle all-weather braking aid for air pressure brakes that operates equally on either a tractor, trailer or both.

SUMMARY OF THE INVENTION

The all-weather braking aid device of the present invention is for use with vehicles having air pressure brakes wherein mechanical brake assemblies are operated by compressed air.

The all-weather braking aid is contained within a main enclosure case which could be bolted or fastened to the tractor or trailer frame of the vehicle. A cover retains the components of the system in a dust-free and water-tight environment.

An air control valve will be in-line with the air pressure system for the vehicle brakes. The control air line is directed from the brake pedal device to the device via an air inlet. The air control valve of the device is normally in the open position. When the air control valve is in the open position, compressed air will pass through the valve and then out via an air outlet. The air outlet is directed back to the control air lines and through the relay valve for the brake systems.

When the air control valve is in the closed position, the air pressure within the control air line to the relay valve diaphragm is diverted or shunted out through an exhaust. If for some reason the valve is not operational, the air pressure will pass through so that the brakes continue to operate in the conventional manner.

The all-weather braking aid includes a compartment enclosed by an internal chassis within the main enclosure case.

Within the internal chassis, the all-weather braking aid device includes both a forward motion detector assembly and a lateral motion detector assembly. The forward motion detector assembly includes a motion detector suspended and hanging from an axle. A bearing or bearings allow the motion detector to swing freely around the axle. A weight or weights are secured to the lower end of the forward motion detector.

An arcuate slot is provided in the forward motion detector, circumferentially around the axle. An extending post is allowed to travel within the arcuate slot so that the maximum movement of the motion detector is controlled by the extending post and slot. When the vehicle is moving and the brakes are applied, the forward force of inertia will tend to move the forward motion detector. When the forward motion detector moves, an extending tab on the motion detector is taken out of alignment with a photo-optical sensor.

A lateral motion detector assembly includes a lateral motion detector which hangs and is suspended from a pin. An extending post extending from the chassis travels within an arcuate slot in the lateral motion detector.

The lateral motion detector includes an extending tab. When the vehicle is subject to lateral inertia, the lateral motion detector will swing and its extending tab move away from a photo-optical sensor.

When either the tab on the forward motion detector or the tab on the lateral motion detector moves away from its respective photo-optical sensor, power is allowed to pass therethrough. In either or both cases, power is then supplied to a timing/firing device which comprises an oscillating timer circuit. Power is thus intermittently supplied to a solenoid switch on the air control valve to provide controlled intermittent pulsing of the brakes of the vehicle.

In the normal mode, the all-weather braking aid is activated by either forward or lateral inertia of the vehicle. In an optional mode, the all-weather braking aid may be activated by a secondary switch mechanism so that the braking aid device is activated upon application of the brakes for use during hazardous road conditions.

It is a further object and purpose of the present invention to provide a vehicle all-weather braking aid for air pressure brakes on the tractor or trailer wherein said electrical components of the tractor may be powered without either forward inertia or lateral inertia sensors being activated, as an option, by use of a secondary on-off switch in the tractor for hazardous road conditions, thereby providing intermittent braking and control thereof. The hazard switch when turned on will apply power to the firing/timing circuit, without either forward inertia or lateral inertia sensors being activated, thereby when the brake pedal is depressed the circuit is activated and the tractor anti-lock starts immediately, without any delay and continues as long as the brake pedal is depressed and the hazard switch is turned on.

DETAILED DESCRIPTION OF THE PREFERRED EMBODIMENT

Figure 1:
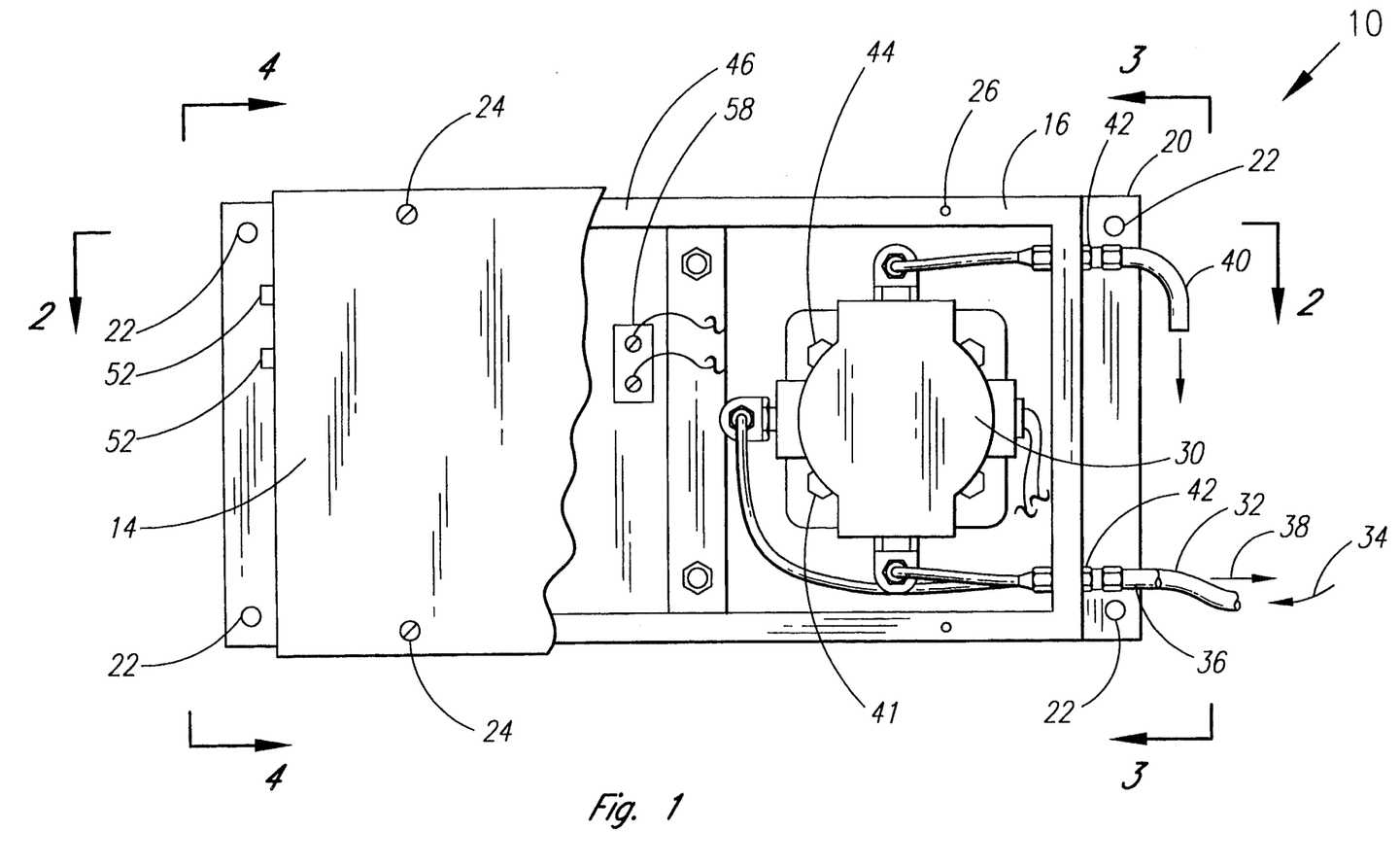
FIG. 1 is a front view of a vehicle all-weather braking aid device constructed in accordance with the present invention having part of the front cover cutaway for ease of viewing.

Referring to the drawings in detail, FIG. 1 shows a side view of an all-weather braking aid device 10 for a vehicle having an air pressure brakes system. A cover 14 has been partially cut away in order to more easily comprehend the invention.

The all-weather braking aid device of the present invention may be utilized with any vehicle using air pressure brakes, although it is particularly suited to large trucks and tractor-trailers.

As is well known, in an air pressure brake system, mechanical brake assemblies are operated by compressed air. Atmospheric air is generally compressed to a maximum system pressure of approximately 120 to 150 pounds per square inch (psi) with the brake system being operated at a slightly lower pressure of 90 to 120 pounds per square inch (psi). Components of a typical air braking system include an air compressor which may be piston driven, a reservoir or tank to store compressed air until required, air lines and fittings to conduct the compressed air and actuators to employ the brakes.

Figures 1A, 2:
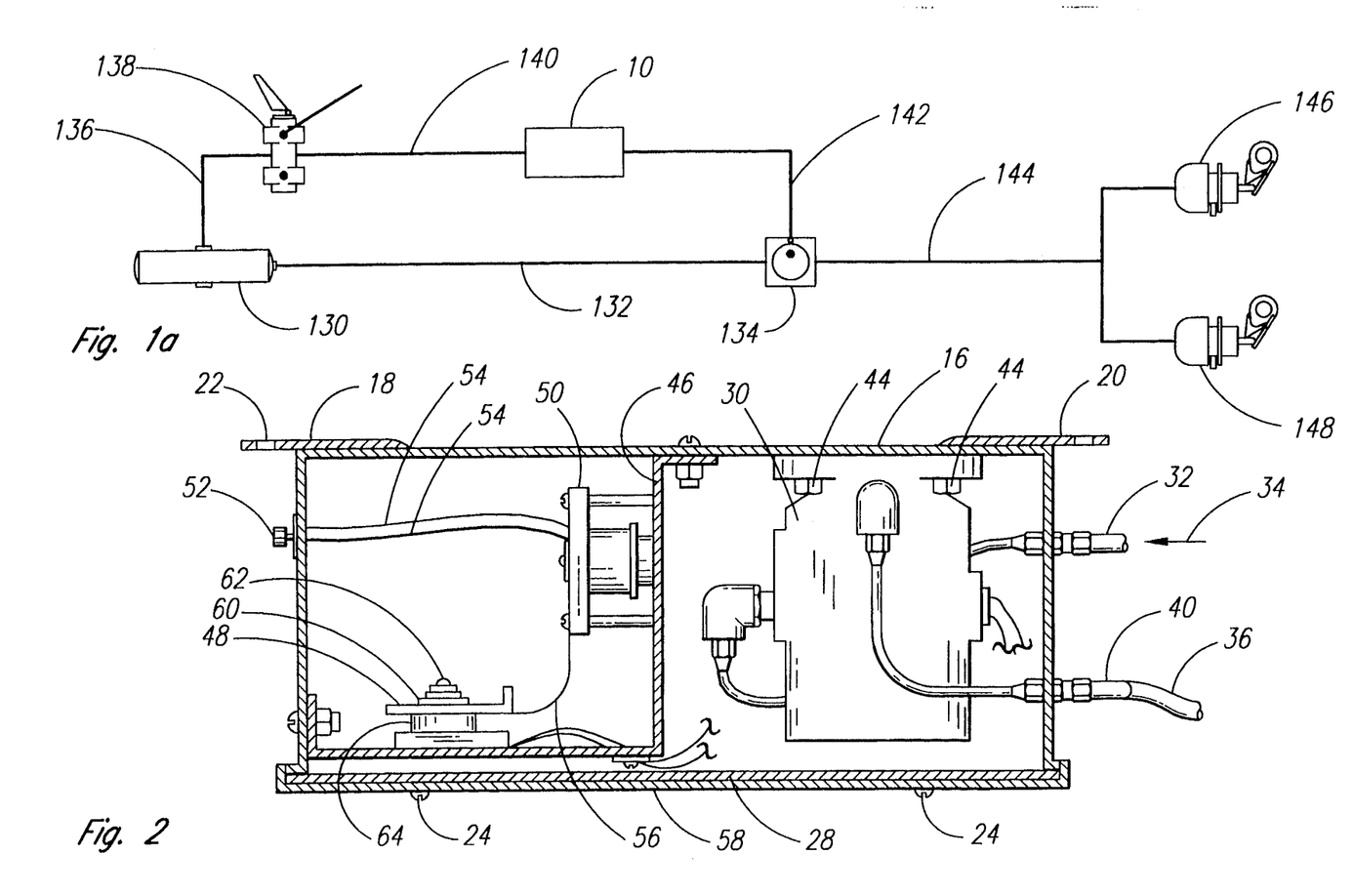
FIG. 1A is a simplified schematic diagram of the vehicle all-weather braking aid device within a typical air brake system.
FIG. 2 is a sectional view taken along section line 2—2 of FIG. 1.

FIG. 1A illustrates a simplified diagram of a typical air brake system. An air reservoir or tank 130 is connected by a main air supply line 132 to a relay valve 134. The air tank or reservoir 130 is also connected by air line 136 to a mechanical brake pedal such as a foot pedal 138. The brake pedal 138 is connected by an air control line 140 to the all-weather braking aid 10 of the present invention. Control line 142 connects the all-weather braking aid 10 to the relay valve 134 so that the device is upstream from the relay valve. Air line 144 connects the brake system to the actuators 146 and 148.

FIG. 1A illustrates a simple system and it will be understood that further embodiments may include additional front wheel brakes. Additionally, separate brakes may be provided for both tractor and trailer.

The all-weather braking aid 10 would be secured to the vehicle. The all-weather braking aid 10 may be installed in various locations on the vehicle, although beneath the vehicle has been found to be a suitable location. In the case of a tractor/trailer, the all-weather braking aid 10 may be secured to the right inside frame of the tractor. Alternatively, the all-weather braking aid may be secured to the trailer on the right inside of the frame near the rear wheels.

As seen in FIG. 1, the all-weather braking aid 10 is contained within a main enclosure case 16 which may include front bracket 18 and rear bracket 20 having apertures 22. Bolts or other fasteners may be placed through the apertures 22 and secured through openings in the tractor or trailer frame (not shown). In this manner, the all-weather braking aid device may be simply added to existing air pressure brake systems.

The entire all-weather braking aid is retained within the air tight and water-tight case by means of the cover 14. The components of the system are, thus, impervious to the elements. The cover may be removed for access to the system by removal of screws or bolts 24 which pass through openings in the cover and apertures 26 in the case 16. Removal of the cover 14 and a gasket 28 allows access to the all-weather braking aid.

FIG. 2 is a sectional view taken along section line 2—2 of FIG. 1. With reference to FIG. 2 and continuing reference to FIG. 1, the system 10 includes an air control valve 30 which will be on line with the air pressure system for the vehicle air brakes. In the present invention, the all-weather braking aid may be installed in-line on the air lines in various places. In one installation, the system may be installed in the air-line from the compressor and reservoir that goes to the rear brakes. The air-line is directed to the system 10 via an air inlet 32. Arrow 34 indicates the direction of the compressed air moving into the all-weather braking aid 10.

The air control valve is normally in the open position. When the air control valve 30 is in the open position, compressed air will pass through the valve and out air outlet 36. Arrow 38 indicates the direction of the compressed air moving out of the all-weather braking aid 10. The air outlet is directed back to the air lines for the air brakes. When the air control valve is in the closed position, the air pressure is diverted or shunted out through an exhaust 40. The air pressure exiting the system is released to the atmosphere.

The air inlet 32, air outlet 38 and exhaust 40, each have fittings 42 which allow attachment to the main enclosure case 16 as well as allow easy and quick attachment of the air line hoses to the all-weather braking aid 10. If the valve 30 is not operational, the air pressure will pass through so that the brakes continue to operate. The air control valve 30 may be affixed to the enclosure case by bolts 44 or otherwise secured.

Because the present invention is interjected in the air lines of the air brake system, it may easily be added to existing vehicles.

Modern truck and tractor-trailer air all-weather braking aids are divided into split or dual circuit air all-weather braking aids which have separate rear axle brake circuits and forward axle circuit. This has been mandated since 1975 by Federal Motor Vehicle Safety Standard 121.

The present all-weather braking aid 10 may be adapted by adding an additional air control valve (not shown) for the forward axle circuit. In addition, a third air pulsing valve may be added to the brake circuit in the service brake air line immediately upstream of the service brakes "glad hand" to pulse the air being directed to the trailer service brakes. With this additional feature, any trailer being towed by a tractor/truck will incorporate the anti-lock/anti-skid controls of the present invention. The balance of the all-weather braking aid 10 would remain the same as described.

The all-weather braking aid 10 includes a compartment enclosed by an internal chassis 46 within the main enclosure case 16.

As will be described, the all-weather braking aid 10 includes a forward motion detector assembly 48 and a lateral motion detector assembly 50. Power to the all-weather braking aid device 10 is supplied by the 12 volt electrical system of the vehicle (not shown) and delivered to the all-weather braking aid through electrical terminals 52. Alternatively, a wire from the brake lights may be connected to one of the terminals 52. The wire should be connected from the output side of the vehicle's brake light switch to the plus (+) 12 volt terminal 52.

The other post on the terminal would be connected to the ground. Electrical power is delivered to the lateral motion detector assembly 50 by wires 54 and thereafter to the forward motion detector assembly 48 by wires 56. The electrical power is brought from the forward motion detector assembly 48 to an internal terminal 58.

Figure 3:
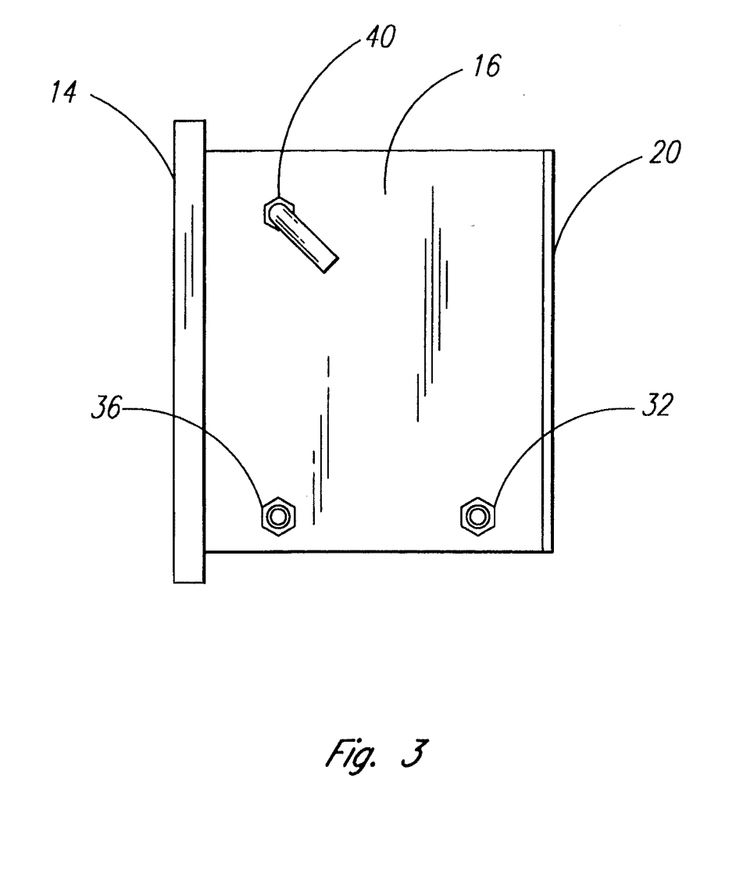
FIG. 3 is a back view of the vehicle all-weather braking aid taken along section line 3—3 of FIG. 1.

FIG. 3 is a rear view of the all-weather braking aid 10 taken along section lines 3—3 of FIG. 1. It is important that the all-weather braking aid device be installed so that the rear of the device is oriented to the rear of the vehicle.

Figure 4:
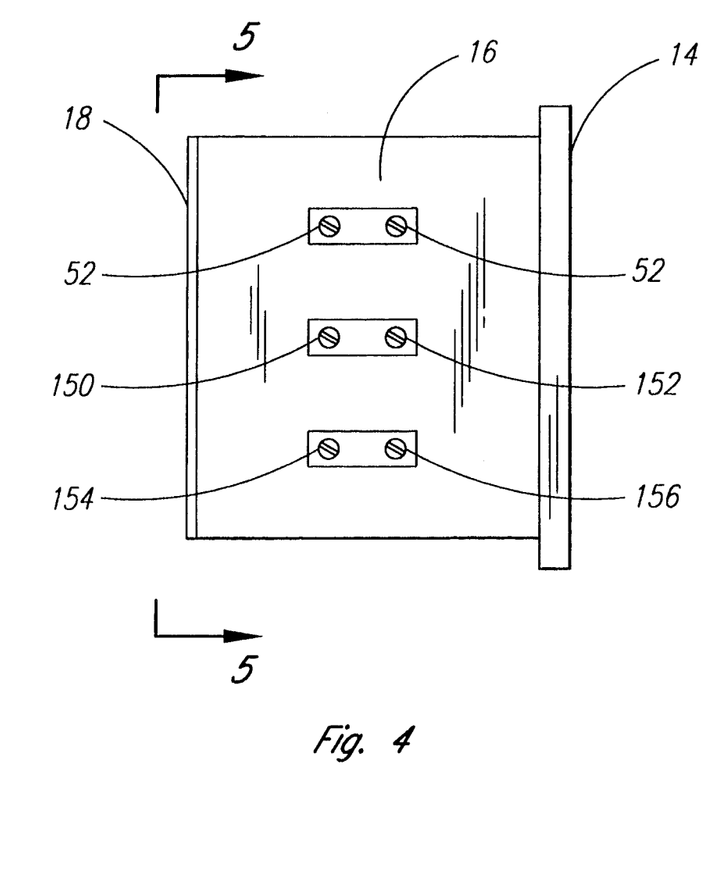
FIG. 4 is a front view of the vehicle all-weather braking aid taken along section line 4—4 of FIG. 1.

FIG. 4 is a front view of the all-weather braking aid 10 taken along section lines 4—4 of FIG. 1 which would be oriented to the front of the vehicle.

Electrical power is provided by the electrical system 98 of the vehicle (not shown in FIG. 4). One side of terminal 52 is a common vehicle ground. A wire is connected from one terminal to the vehicle frame thereby grounding the device to the vehicle frame. The other side of terminal 52 is connected to the "accessory" terminal on the master on-off switch. Twelve volt direct current power is supplied to the device. When the vehicle's brake pedal is depressed, the brake light switch is activated allowing 12 volt DC current to flow through the brake light switch. When the master on-off switch is turned to the "on" position, current flows through the master on-off switch from the power terminal to the accessory terminal and thereafter to terminal 52.

A second, optional switch, may be referred to as a hazard switch. This hazard switch, when turned to the "on" position will apply power to the device 10 without the motion detector pendulums having been moved by vehicle inertia. This hazard switch may be located in the cab of the vehicle for use by the operator. Turning the hazard switch on will force the firing/timing circuit to pulse the 12 volt DC power to the braking aid valves each time the vehicle brake pedal is depressed and the brake light circuit activated. Terminal 150 is connected by a wire to the "power" terminal of the hazard switch. Terminal 152 is connected by a wire to the "accessory" terminal of the hazard switch.

The third "ground" terminal of the hazard switch is connected to the "accessory" terminal of the master on-off switch so that when vehicle brake light switch is activated, power is immediately applied to the firing-/timing circuit of the braking aid 10. The final or third set of terminals, 154 and 156, are used for an external output of the braking aid 10 to one or more remote valves (not shown). As an example, a remote valve may be mounted in the trailer service line providing control air to the trailer brakes through the trailer "glad hand" connection. Terminals 154 and 156 provide positive and negative polarities of 12 volt DC power. One terminal is connected to either wire on a front steering axle remote valve and the other terminal to the other wire. Similarly, wires from terminals 154 and 156 may be connected to a remote valve supplying control air to the trailer brakes. By using these remote valves, all of the brakes on a tractor/trailer combination can be made to have the anti-lock features of the braking aid 10.

Figure 5:
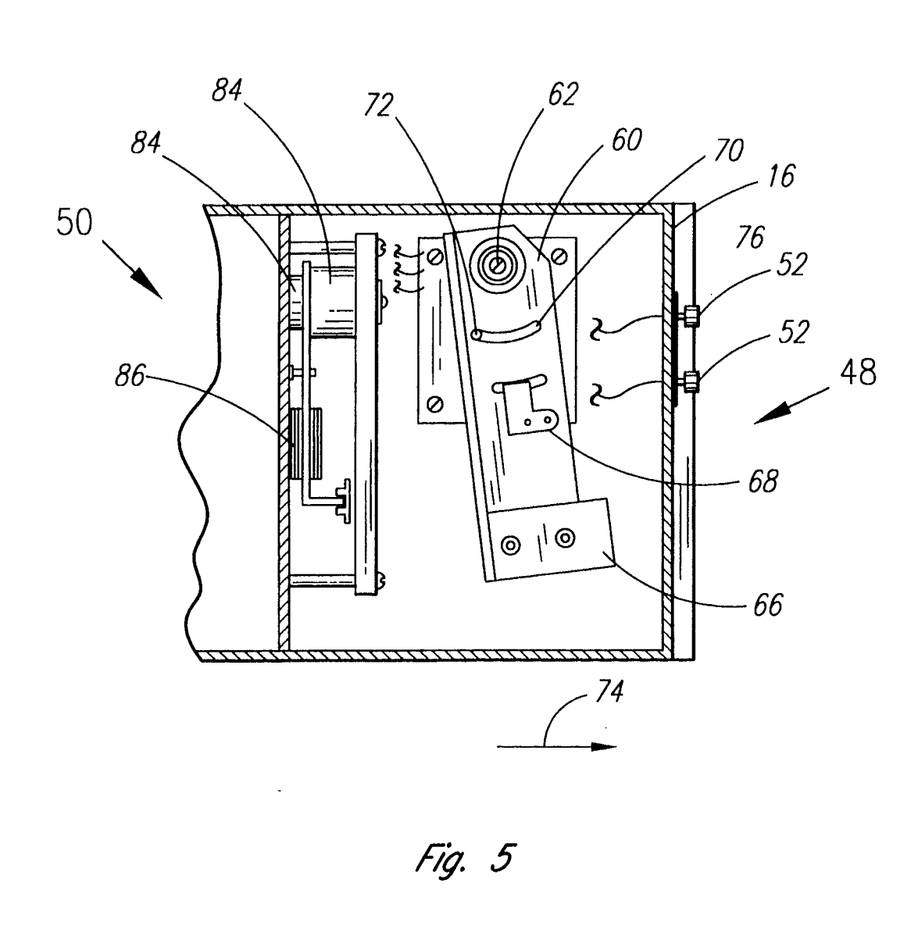
FIG. 5 is a sectional view of the vehicle all-weather braking aid constructed in accordance with the present invention taken along section line 5—5 of FIG. 4.

FIG. 5 shows a partial sectional view taken along section line 5—5 of FIG. 4 so that the forward motion detector assembly 48 is clearly visible. With reference to FIG. 5 and continuing reference to FIG. 2, the forward motion detector assembly 48 includes a motion detector 60 which is suspended from and hangs from an axle 62. A bearing or bearings 64 allow the motion detector 60 to swing freely about the pin without any dampening of other hindrance. A weight or weights 66 are secured to the lower end of the motion detector 60.

Figure 6:
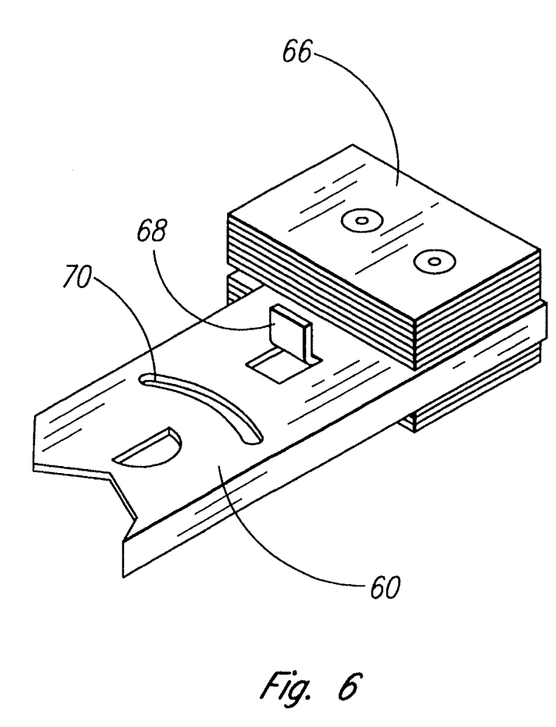
FIG. 6 is a perspective view of a forward motion detector of the vehicle all-weather braking aid shown in FIG. 1.

The motion detector 60 has an extending tab 68. The tab may best be seen in FIG. 6 which shows a perspective view of the motion detector apart from the braking aid. An arcuate slot 70 is provided in the motion detector. The slot is circumferentially arranged around the axle 62. An extending post 72 is allowed to travel within the arcuate slot 70. The maximum movement of the motion detector is, thus, controlled by the extending post 72 and slot 70.

When the vehicle is at rest (as in FIG. 5), the force of gravity allows the motion detector to hang nearly vertical to the ground (not shown). The extending post 72 is arranged with the slot so that the motion detector will be slightly off from vertical. In the present embodiment, the motion detector is held at rest approximately three degrees (3°) counterclockwise from vertical. It has been found that this arrangement will prevent the all-weather braking aid 10 from being actuated when the vehicle (not shown) is on a slight downward incline.

When the vehicle is moving and the brakes are applied, the forward force of inertia will tend to move the forward motion detector 60 in the direction shown by the arrow 74.

Figure 7:
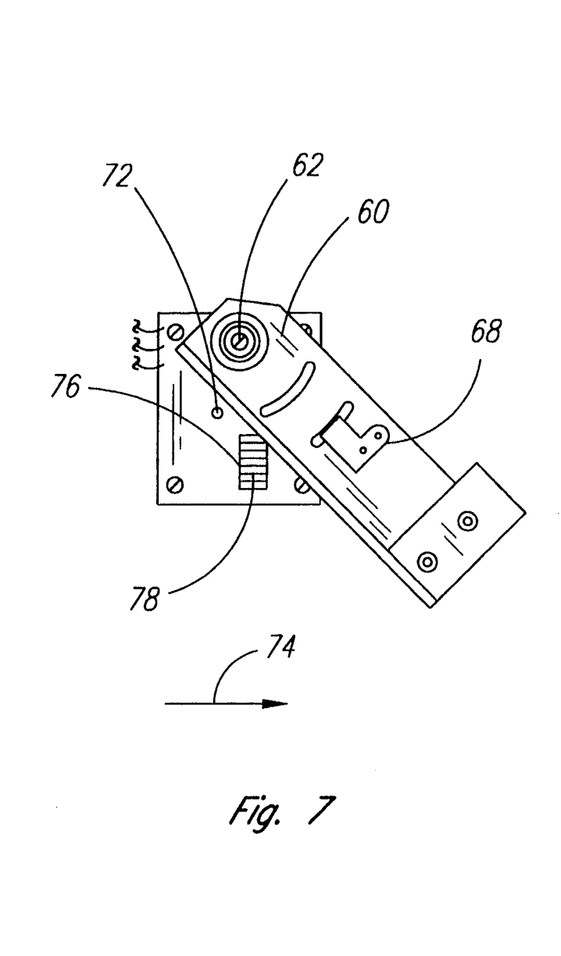
FIG. 7 is a partial sectional view of the vehicle all-weather braking aid wherein inertia has moved the forward motion detector from its resting position.

This occurrence may be seen in FIG. 7 wherein the motion detector 60 moves in the direction of arrow 74. When this occurs, the extending tab 68 is taken out of alignment with a forward photo-optical sensor 76.

The photo-optical sensor, a light emitting diode, is a well known device which has an opening 78. The extending tab 68 will rest within the opening 78 until the motion detector is moved by inertia of the vehicle.

When the tab is moved away from the photo-optical sensor 76, the sensor will be actuated which, in turn, actuates the solenoid switch on the air valve 30.

It will be appreciated that the placement of the weights on the motion detector, the length of the motion detector and placement of the tab and sensor all affect the sensitivity of the motion detector assembly. It has been found that braking at low speeds will not cause the motion detector to move. Thus, the all-weather braking aid device will only be actuated when necessary.

Figure 8:
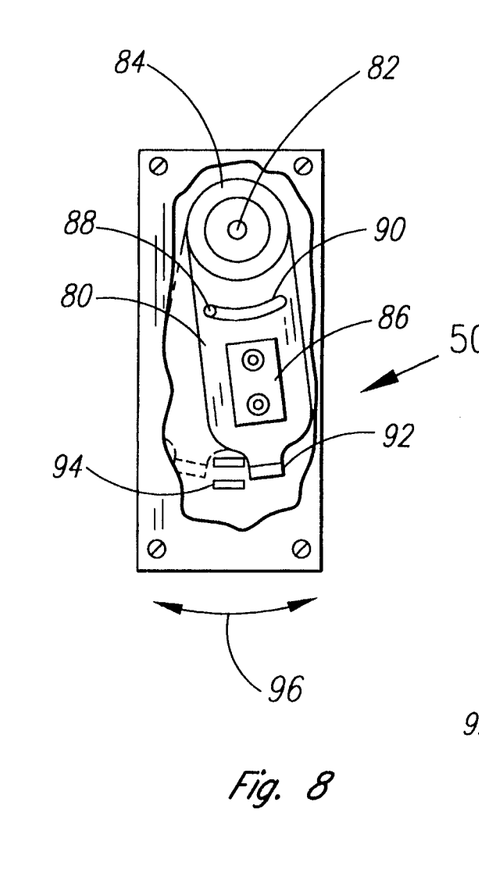
FIG. 8 is a sectional view taken along section line 8—8 of FIG. 5.

The lateral motion detector assembly 50 may be seen in FIG. 5 and in FIG. 8, which is a sectional view taken along section line 8—8 of FIG. 5.

The lateral motion detector assembly 50 includes a lateral motion detector 80 which hangs from and is suspended from a axle 82. Bearings 84 allow the motion detector to swing freely without any dampening or other hindrance. Weights 86 are secured to the lateral motion detector. An extending post 88 extending from the chassis 46 travels within an arcuate slot 90 in the lateral motion detector.

Figure 9:
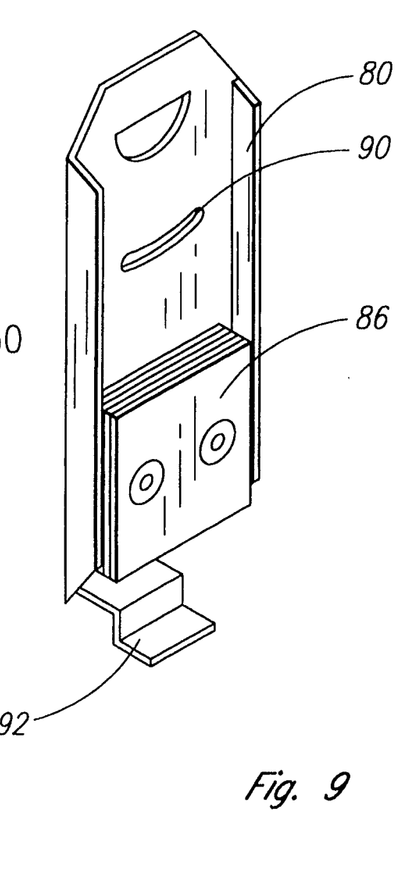
FIG. 9 is a perspective view of a lateral motion detector which is apart from the vehicle all-weather braking aid of the present invention.

The lateral motion detector 80 includes an extending tab 92 which is best seen in FIG. 9, showing a perspective view of the lateral motion detector 86 apart from the all-weather braking aid 10. The arcuate slot 90 is circumferentially arranged around the axle 82.

When the vehicle is subject to lateral inertia, such as when the vehicle is skidding or is jackknifing, the lateral motion detector 80 will swing and its extending tab 92 move away from a lateral photo-optical sensor 94 by virtue of the lateral inertia of the vehicle. This condition is seen in FIG. 8. The direction of the lateral inertia is illustrated by the arrow 96.

Figure 10:
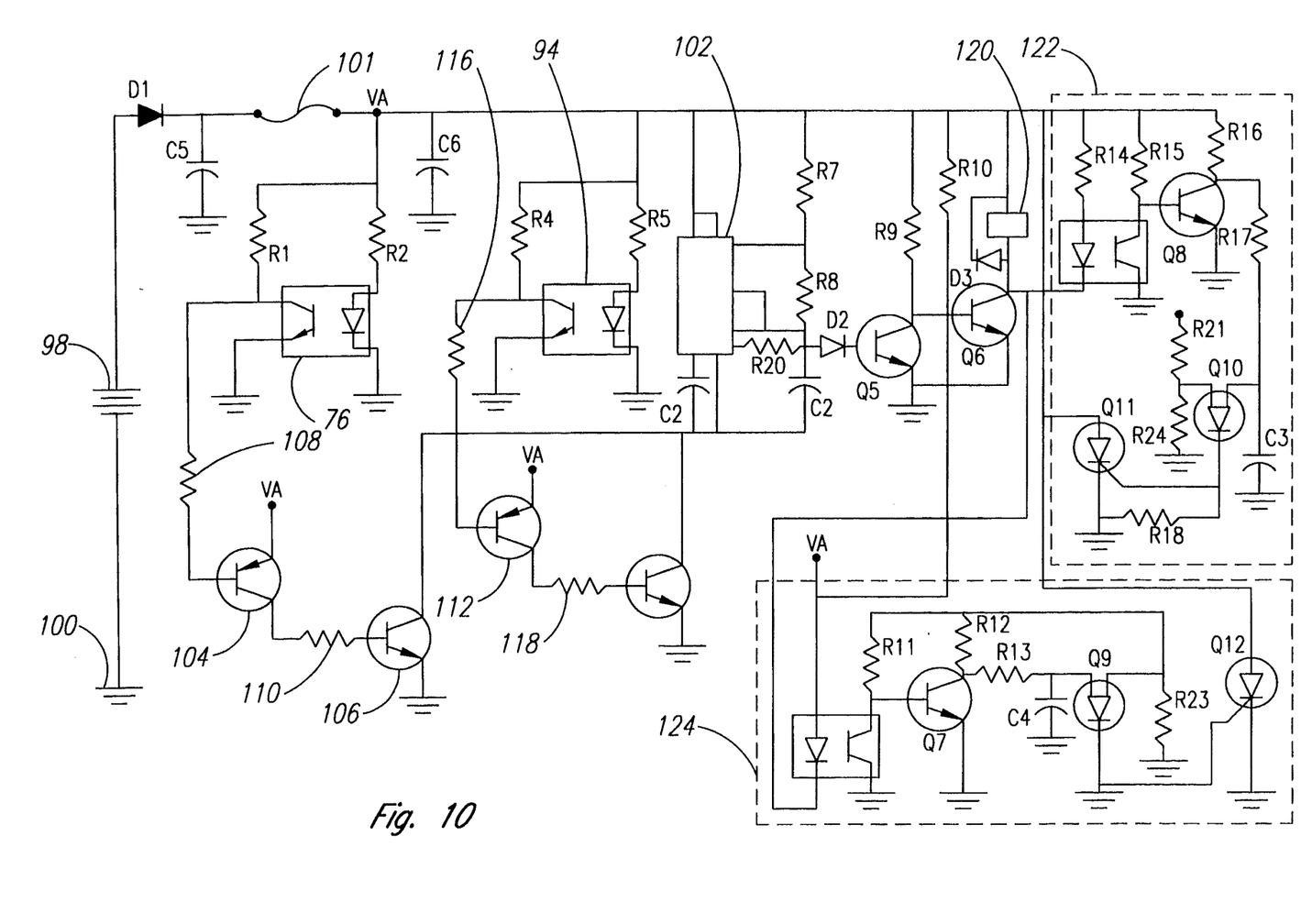
FIG. 10 is a simplified schematic diagram of the electrical components of the vehicle all-weather braking aid device as shown in FIG. 1.

FIG. 10 illustrates a simplified schematic of the electrical system for the braking apparatus 10.

As previously described, electrical power is provided by the electrical system 98 of the vehicle (not shown). As is common, one side is directed to a ground 100. When either of the motion detectors or both swing out of alignment due to inertia of the vehicle, the photo optical sensors 76 and 94 are activated. Power is then supplied to a timing/firing device 102.

In the event a short fuse 101 is blown, then no power is supplied through fuse 101 to the timing device 102, and no power to the all-weather braking aid, always returns to conventional braking.

Transistors 104 and 106 and resistors 108 and 110 comprise a safety circuit between the forward sensor and the timing device. Transistors 112 and 114 and resistors 116 and 118 provide a safety circuit between the lateral sensor and the timing circuit.

The oscillating timing circuit 102 includes an oscillating timing chip which, when activated, supplies intermittent power to a solenoid switch 120 which controls and operates the air control valve 30.

The circuit indicated by dashed line 122 is a safety circuit as is the safety circuit indicated by dashed line 124.

The valve 30 will thus be closed for a selected period of time and then opened. In one embodiment tested, the valve 30 will be closed (no brakes) for a period of 0.111 milliseconds and then opened (brakes applied) for a period of 0.222 milliseconds. This would be equivalent to mechanically "pumping" the brakes several times per second.

The simple electronics and components have been found to be reliable in operating temperatures from −40° F. to 150° F. Because it contains only three moving components, the forward motion detector assembly, the lateral motion detector assembly and the control valve, no service or adjustments are required.

It has been found that controlled intermittent pulsing of brakes of the vehicle corrects vehicle or tractor-trailer alignments for skid-free anti-lock braking.

F.M.V.S.S. 121 (Federal Motor Vehicle Safety Standard Number 121) also specifies maximum time intervals for air brakes to be applied from the time of depressing the brake pedal valve. These maximum time intervals are:

| TYPE VEHICLE | MAXIMUM TIME Interval Until Brakes are Applied | MAXIMUM TIME Interval Until Brakes are Applied |
| --- | --- | --- |
| Truck/Tractor | 0.45 Seconds | 0.55 Seconds |
| Towing Trailer | 0.50 Seconds | 1.00 Seconds |

Similarly, F.M.V.S.S. 121 provides maximum time intervals for release times.

The present invention provides a vehicle with a braking device that will meet government requirements of applied and release time and provide a better brake with complete drivers steering control while braking. None of the prior art would begin to qualify or be permitted to be installed on today's trucks or trailers with air brakes. A braking device must be qualified to meet the new government time requirements and also to have full steering control while braking.

Recent tests were performed by a worldwide recognized authority on vehicle air brakes. These tests were in accordance with procedures used to verify application and release times for air brakes as outlined above. Equipment used to measure elapsed time was a proprietary testing computer designed for and approved by the Department of Transportation.

Whereas, the present invention has been described in relation to the drawings attached hereto, it should be understood that other and further modifications, apart from those shown or suggested herein, may be made within the spirit and scope of this invention.

What is claimed is:

1. An all-weather braking aid system for a vehicle having a brake mechanism wherein a mechanical brake releases air pressure from a tank through a relay valve, which system comprises:

motion detector means to swing freely in response to inertia of said vehicle;

sensor means operatively engaged with said motion detector means;

oscillating timer means activated by said sensor means;

valve means in advance of said relay valve to regulate said air pressure, said valve means normally in an open position to allow flow of said air pressure and movable to a closed position to interrupt said air pressure; and switch means activated by said oscillating timer means in order to close said valve means for one selected duration and then open said valve means for another selected duration, thereby providing controlled intermittent braking.

2. An all-weather braking aid system as set forth in claim 1 wherein said motion detector means includes a forward motion detector responsive to forward inertia of said vehicle and a lateral motion detector responsive to lateral inertia of said vehicle.

3. An all-weather braking aid system as set forth in claim 2 wherein said vehicle travels on the ground and wherein said forward motion detector will be retained approximately three degrees counterclockwise from vertical to the ground when in position at rest to prevent said motion detector from moving when said vehicle is on a slight grade.

4. An all-weather braking aid system as set forth in claim 2 wherein said forward motion detector has an arcuate slot and wherein an amount of radial movement of said motion detector is constrained by an axle allowed to travel in said arcuate slot.

5. An all-weather braking aid system as set forth in claim 2 wherein said lateral motion detector has an arcuate slot and wherein an amount of radial movement of said motion detector is constrained by an axle allowed to travel in said arcuate slot.

6. An all-weather braking aid system as set forth in claim 2 wherein said forward motion detector and said lateral motion detector each have a photo optical sensor and wherein an extending tab on each motion detector interrupts its photo optical sensor.

7. An all-weather braking aid system as set forth in claim 2 wherein said switch means may be activated by a secondary on-off switch in a tractor or trailer for hazardous road conditions without said forward motion detector or said lateral motion detector being activated.

8. An all-weather braking aid system as set forth in claim 7 wherein said oscillating timer is powered by a brake light system for said tractor or trailer so that the timer is activated by depressing a brake pedal.

9. An all-weather braking aid system as set forth in claim 1 wherein said sensor means includes a photo optical sensor and wherein an extending tab on said motion detector means interrupts said photo optical sensor.

10. An all-weather braking aid system as set forth in claim 1 wherein said timer means includes an oscillating timer.

11. An all-weather braking aid system as set forth in claim 1 wherein said valve means includes a three-way valve wherein said air pressure will be exhausted when in said closed position.

12. An all-weather braking aid system as set forth in claim 1 wherein said vehicle includes an electrical system and wherein said switch means is powered by the electrical system of said vehicle.

13. An all-weather braking aid system as set forth in claim 1 wherein said vehicle includes an electrical system and wherein said timer means is powered by the electrical system of said vehicle.

14. An all-weather braking aid system as set forth in claim 1 including secondary switch means independent of said oscillating timer means to close said valve means for one selected duration and then open said valve means for another selected duration.

15. An all-weather braking aid system as set forth in claim 1 whereby braking on tractor front axle and braking on rear axles all apply and release at the same time giving controlled balance intermittent braking which reduces locking of wheels and skidding of tires.

16. An all-weather braking aid system as set forth in claim 15 wherein applied braking lasts longer than released braking.

17. An all-weather braking aid system as set forth in claim 1 whereby all braking on all wheels on one axle or more of a trailer of said vehicle are all equal, applying and releasing at the same time giving a controlled balance intermittent braking which helps to eliminate locking of wheels and skidding of tires.

18. An all-weather braking aid system as set forth in claim 1 including bypass means to bypass said braking aid system in the event of malfunction of said valve means.

19. A method of controlled intermittent braking for a vehicle having a brake mechanism wherein a mechanical brake releases air pressure from a tank through a relay valve, which method comprises:
(a.) sensing forward inertia or lateral inertia of said vehicle by sensor means which are activated by movement of motion detector means allowed to swing freely in response to said inertia;
(b.) supplying electrical power responsive to inertia to oscillating timer means in response to said forward inertia or lateral inertia;
(c.) intermittently supplying said power to switch means by said oscillating timer means; and
(d.) regulating said air pressure by a valve in advance of said relay valve controlled by said switch means in order to close said valve means for one selected duration and then open said valve means for another selected duration, thereby providing controlled intermittent braking.

* * * * *